No. 738,807. PATENTED SEPT. 15, 1903.
H. S. HUNT.
CREAM SEPARATOR.
APPLICATION FILED FEB. 12, 1903.
NO MODEL.
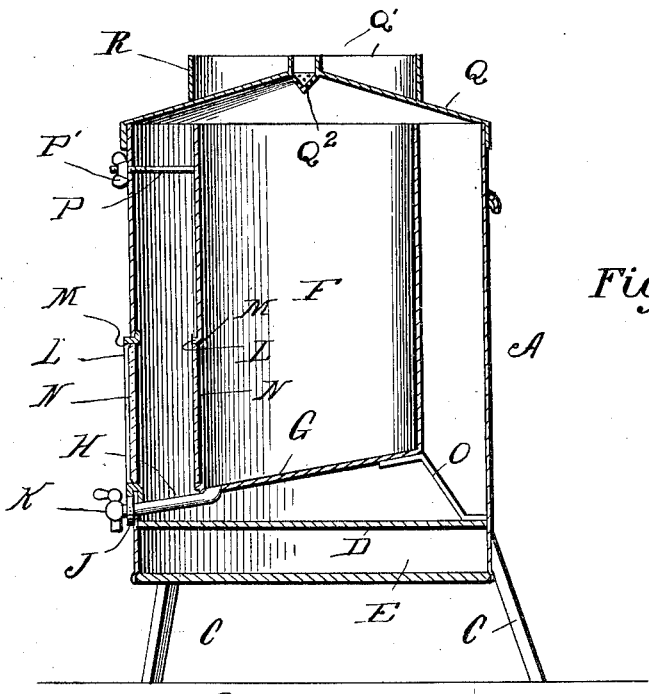
Fig. 1.
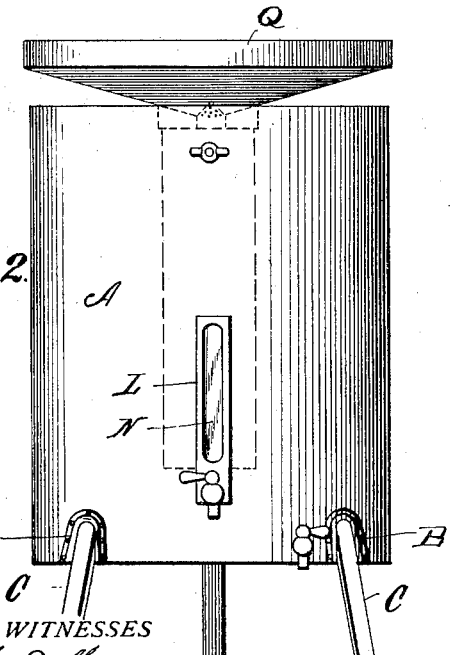
Fig. 2.
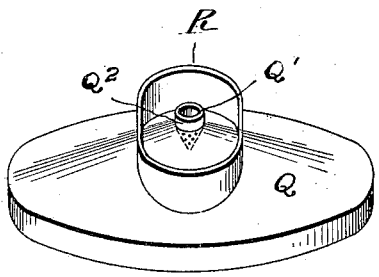
Fig. 3.
Henry S. Hunt.
INVENTOR
Attorney
WITNESSES No. 738,807. Patented September 15, 1903.

UNITED STATES PATENT OFFICE.

HENRY S. HUNT, OF NEWARK, NEW YORK, ASSIGNOR OF ONE-HALF TO WILLIAM F. HUNT, OF NEWARK, NEW YORK.

CREAM-SEPARATOR.

SPECIFICATION forming part of Letters Patent No. 738,807, dated September 15, 1903.

Application filed February 12, 1903. Serial No. 143,023. (No model.)

*To all whom it may concern:*

Be it known that I, HENRY S. HUNT, a citizen of the United States, residing at Newark, in the county of Wayne and State of New York, have invented certain new and useful Improvements in Cream-Separators, of which the following is a specification.

My invention relates to improvements in cream-separators, and refers particularly to what are known as "creaming-cans," in which the milk is placed in an inside receptacle surrounded by an outer receptacle containing cold water for chilling the milk and causing the cream to raise and gather above the milk.

One object of my invention is the provision of a cream-separator of this character which will embody in a single structure means for separating the cream and for ventilating or supplying pure air and retaining the cream free from impurity.

Another object of my invention is the provision of a cream-separator which will possess merit in point of completeness, simplicity, and durability and which will be thoroughly efficient and practical in every particular.

With these objects in view my invention consists of a cream-separator embodying novel features of construction and combination of parts substantially as disclosed herein.

Figure 1 represents a vertical central sectional view of my complete invention. Fig. 2 represents a front elevation of the separator. Fig. 3 represents a perspective view of the cover, which is of novel construction.

Referring by letter to the drawings, the letter A designates the outer receptacle, preferably of cylindrical form and of galvanized metal, which is provided with cleats B at its bottom which receive the legs or supports C, this construction rendering the legs detachable. Within the receptacle near its main bottom is placed an auxiliary bottom plate D, which provides a dead-air space or chamber E. Within the cylindrical receptacle is placed the milk-receiving receptacle F, which is of elliptical shape and centrally arranged within the outer receptacle, the purpose being to permit the water to entirely surround and contact with all portions of the milk-receptacle to effect a rapid cooling of the milk. The milk-receptacle is provided with an inclined bottom G, which enables the milk to be readily drawn off through the discharge-pipe H, which passes through the outer receptacle and is held in place by the binding-nut J, and the discharge-pipe is provided with a draw-off cock or spigot K. The outer and inner receptacles are each provided with frames L, having alining openings M, which receive sight-glasses N, which permit a view from the outside of the contents of the inner receptacle. To secure the inner receptacle rigidly in place, I provide the bottom support O, arranged on one side at the bottom of the milk-receptacle, and the top support P, arranged at the upper portion of the cream-receptacle on the opposite side and consisting of a pin having a threaded end engaged by a thumb-nut P', and this construction permits the entire removal of the cream-receptacle when desired. Upon the outer receptacle fits the cylindrical cover Q, which is of conical form and at its center or apex is formed with a spout Q', integral with which and depending therefrom is the conical filter $Q^2$, and also formed upon the conical cylindrical cover is the elliptical rim R, which forms when the cover proper is inverted a cover for the milk-receptacle, as shown in Fig. 2.

The manner of using my separator will be readily understood from the foregoing description, taken in connection with the drawings, and I would simply state that milk is placed in the inner receptacle and cold water in the outer receptacle, the action of the cold water causing the cream to rise to the top, from which it can be drawn off, and the milk will be discharged through the spigot.

It is evident that I provide a cream-separator which is complete in every respect and which will perform the functions for which it is designed in an efficient and practical manner.

I claim—

1. A cream-separator, consisting of the cylindrical receptacle having the bottom dead-air chamber, the elliptical milk-receptacle arranged therein, a discharge-pipe leading from the milk-receptacle and having a cock or spigot, sight-glasses arranged in the outer and inner receptacles and in line, a cover for the outer receptacle having a spout and strainer and a cover for the inner or milk receptacle.

2. A cream-separator consisting of an outer cylindrical receptacle, an inner elliptical milk-receptacle, top and bottom supports for sustaining the inner receptacle, a cover for the outer receptacle having a central spout and an integral strainer and provided with an elliptical rim forming a cover for the inner receptacle.

In testimony whereof I affix my signature in presence of two witnesses.

HENRY S. HUNT.

Witnesses:
ADAM BLESSING,
LLOYD B. HOLLISTER.